July 13, 1926.
H. C. PASS
1,591,995
TOTALIZER
Filed July 27, 1925    2 Sheets-Sheet 1
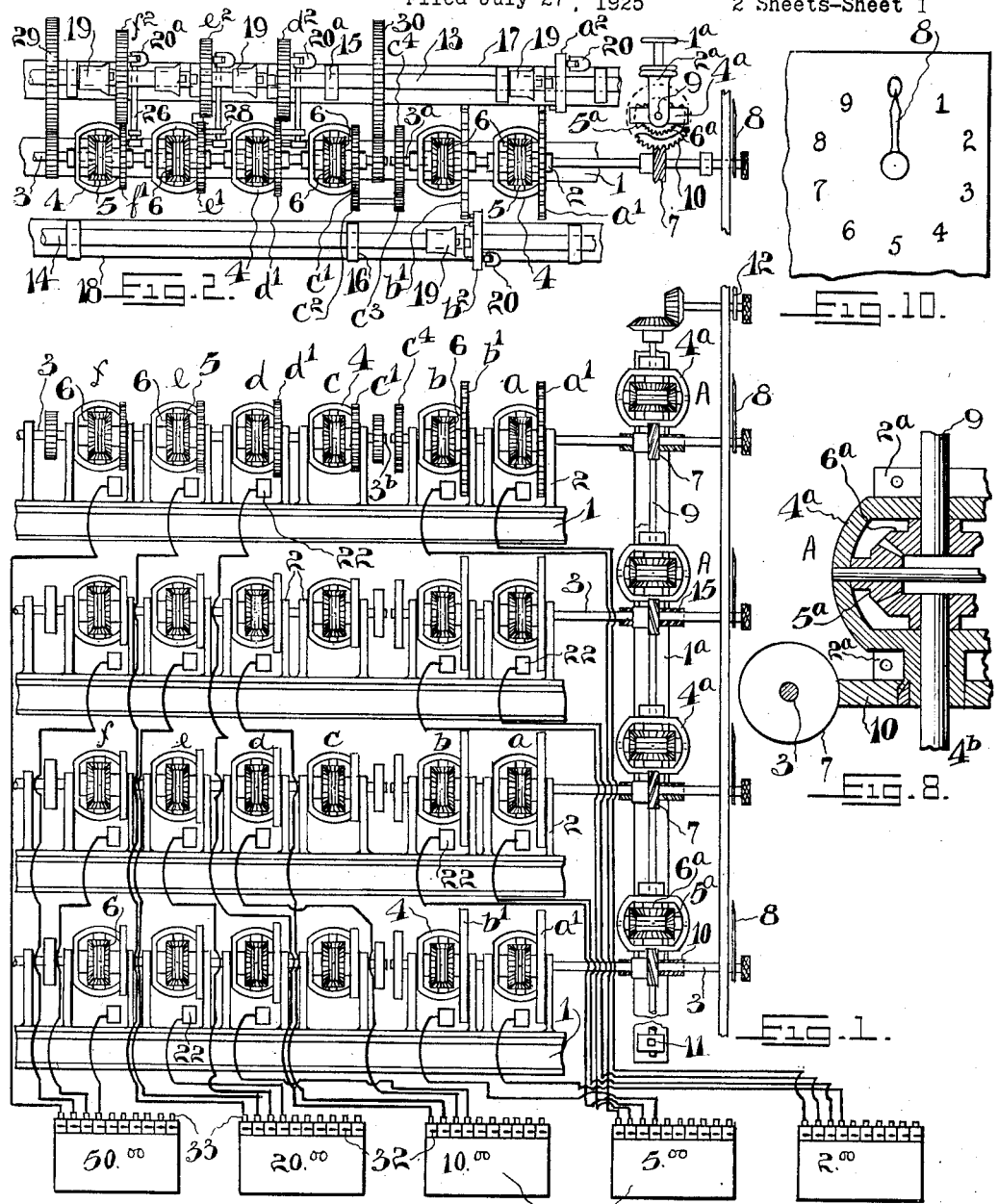
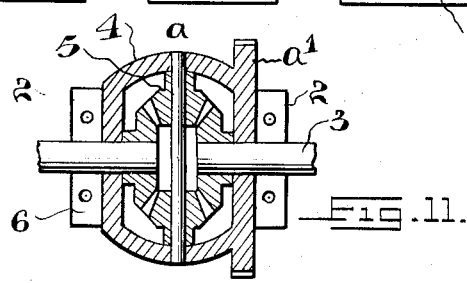
INVENTOR.
H. C. Pass.
BY J. Edward Maybee.
ATTY.

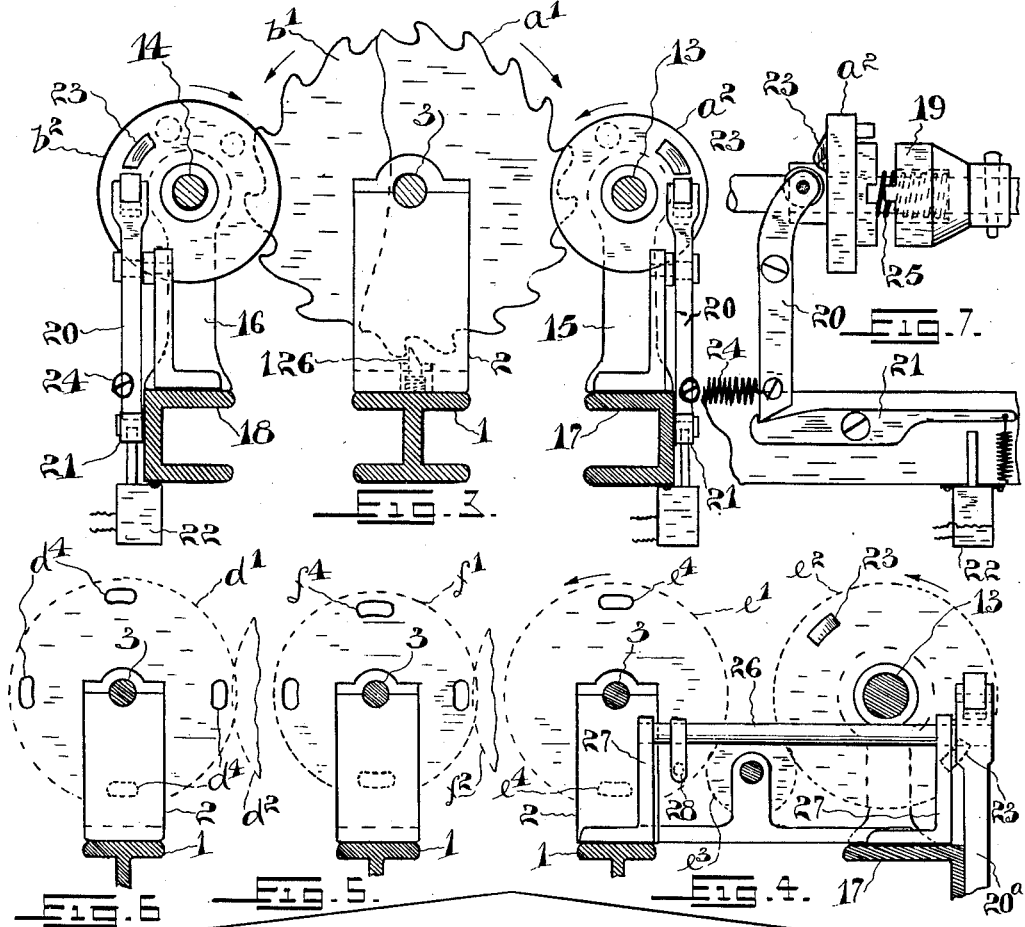
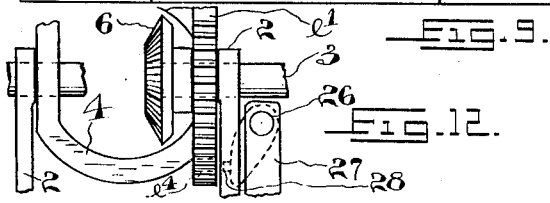

Patented July 13, 1926.

1,591,995

UNITED STATES PATENT OFFICE.

HARRY C. PASS, OF TORONTO, ONTARIO, CANADA.

TOTALIZER.

Application filed July 27, 1925. Serial No. 46,357.

This invention relates to totalizers, and more particularly to that type for use in connection with pari mutuel systems employed in horse racing. The object of my invention is to provide a totalizer which is simple in design and which will be positively controlled to automatically and instantaneously register the wagers on each horse and the total wagers on all the horses for each position.

I attain my objects by providing a plurality of sectional shafts, one for each horse, each shaft being adapted to actuate an indicator which is rotated a predetermined distance for the smallest wager and the rotary movement whereof is increased in proportion to the greater amount of a larger wager. The sectional shafts are adapted to actuate a totalizer shaft which actuates an indicator to give the totals for the first mentioned shafts. In practice there will be three sets of horse and totalizing shafts, one for each position (1st, 2nd and 3rd) but as these sets are similar to one another only one is shown and described.

The construction is hereinafter more fully described and illustrated in the accompanying drawings in which Fig. 1 is a diagrammetic view illustrating the method of arranging the sectional shafts relative to the totalizing shaft, in this view there are only four sectional shafts and five ticket issuing booths shown;

Fig. 2 a plan view of a sectional shaft connected with a unit of its totalizing shaft;

Fig. 3 a cross section of the sectional and the two constantly rotated shafts showing the mechanism for intermittently driving two sections of the former in opposite directions, one of the toothed wheels being broken away to show the other wheel behind it;

Fig. 4 a similar view showing the controlling mechanism for a section driven by the constantly rotating shaft;

Fig. 5 a cross section of the sectional shaft showing the gear thereon adjacent the gear shown in Fig. 4;

Fig. 6 a cross section of the sectional shaft showing the gear thereon adjacent the gear in Fig. 4 but on the side opposite the one shown in Fig. 5;

Fig. 7 a front elevation of the parts shown in Fig. 3;

Fig. 8 a sectional detail of a totalizing shaft unit;

Fig. 9 a front view of the indicating board, partly broken away;

Fig. 10 a front view of the indicator on a large scale;

Fig. 11 a horizontal section of a unit on a sectional shaft; and

Fig. 12 an end elevation of the unit shown in Fig. 4.

Referring to Figs. 1, 2, 3 and 11, 1 is a support on which are secured the brackets 2. In these brackets are journalled the sections of a sectional shaft 3 having certain of its sections connected together by differential gearing forming a part of the units $a$, $b$, $c$, $d$, $e$ and $f$. In practice for each position (1st, 2nd and 3rd) there will be ten of the shafts 3, one for each horse or if there are more than ten horses in a race the last shaft will represent the "field". The number of units on the shafts, for each position, will depend on the number of booths employed for selling tickets for each position as hereinafter described. Each unit comprises a housing 4 in which are journalled the pinions 5 which mesh with the gears 6 secured to the ends of adjacent sections of the sectional shafts 3. The housings of the units $a$ and $b$ are provided with toothed wheels $a^1$ and $b^1$ respectively and are journalled on the sectional shafts, see Fig. 11. The adjacent toothed wheels with their housings are rotated in opposite directions to one another. Preferably these wheels are formed as ratchet wheels having their teeth cut in reverse directions to one another. One end of each shaft 3 is provided with a spiral or a helical gear 7 and carries an indicator 8. The latter is frictionally engaged with the shaft, in any suitable manner, whereby the indicator may be manually reset at zero at the end of each race.

The section $3^a$ of the shaft 3, to which the unit $b$ is connected, (see Fig. 2) is held, as hereinafter described, from rotating backwardly and should the toothed wheel $b^1$ be rotated one tooth in an anti-clockwise direction, the indicator is rotated as follows. This movement of the wheel rotates the housing 4 of the unit $b$ to cause the pinions 5 to travel over the teeth on the left hand differential gear 6, which is normally held stationary as hereinafter described, and drive the right hand gear 6 in an anti-clockwise direction. This drives the section of the shaft 3 connecting the adjacent gears 6 of the units $b$ and $a$ and thus the left hand gear 6 of the unit $a$ in an anti-clockwise direction. The pinions 5 of the unit $a$ are thus driven in an opposite direction to the pinions 5 of the unit $b$ which drives the right hand gear 6 of the unit $a$ and the indicator in a clockwise direction. If the toothed wheel $a^1$ is moved to register a wager during the movement of the toothed wheel $b^1$ the pinions 5 of the unit $a$ will be rotated in a clockwise direction round the axis of the left hand gear 6 in addition to the rotary movement on their axes. As this gear 6 is travelling in an anti-clockwise direction the pinions will be increased in speed and thus the movements of the right hand gear 6 and the indicator will be increased.

The toothed wheel $a^1$ is provided with twenty teeth and the toothed wheel $b^1$ is provided with sixteen teeth which are driven as hereinafter described. The wheel $a^1$ is adapted to be moved one tooth, or one-twentieth of a revolution, to rotate the indicator, as hereinbefore described, one-tenth of a revolution, due to the pinions 5 travelling round the left hand gear 6 of the unit. A two tooth revolution of the wheel $b^1$ causes the indicator to turn a quarter revolution or two and a half times as far as the movement caused by the wheel $a^1$. From this it is evident that if the latter wheel is operated each time a \$2.00 wager is made and the wheel $b^1$ operated each time a \$5.00 wager is made the indicator will be proportionately rotated to give an indication which would correspond with the indication if the wagers were all of the smaller denomination. In other words the \$5.00 wagers are converted into the correct number of \$2.00 wagers before they are indicated.

A totalizing shaft 9 is formed in sections which are connected together by the differential gearing $5^a$, $6^a$ of each unit A (see Figs. 1, 2 and 8). There will be ten of these units employed in each totalizing shaft, one for each of the sectional shafts 3. Each unit A is provided with a housing $4^a$ having a helical gear 10 secured thereto which is adapted to mesh with the helical gear 7 on the adjacent shaft 3. The adjacent sets of gears 7 and 10 have their teeth cut in opposite directions whereby the direction of rotation of the adjacent sections of the shaft 9 is reversed. This arrangement and the mode of operation is similar to that employed in the sectional shafts 3 as hereinbefore described. The only difference between the units A and $a$ is the substitution of the helical gear 10 for the ratchet wheel $a^1$ and the method of securing the former to the housing $4^a$. The latter is provided with a hub $4^b$ (see Fig. 8), journalled in and extending beyond a bracket $2^a$. The gears 10 are secured to the hub extensions $4^b$ and the sections of the shaft 9 are journalled in the latter. The brackets $2^a$ are secured to a vertically arranged support $1^a$ (see Figs. 1 and 2). One end of the shaft 9 is locked by any suitable means such as a set screw 11 and the other end is adapted to actuate an indicator 12. From this it is evident that by operating any one or more of the sectional shafts 3 the unit or units A geared thereto will be driven to rotate the totalizing shaft 9 a number of revolutions corresponding to the total revolutions of the shafts 3. The totalizing indicator 12 will thus indicate the total of the individual recordings of the indicators 8.

The units $a$ and $b$ are actuated in the following manner. To constantly rotating shafts 13 and 14 (see Figs. 2 and 3), journalled in bearings 15 and 16 which are secured to supports 17 and 18, are driven in opposite directions to one another by a suitable source of power (not shown). The constantly rotating shafts are mounted one at each side of each sectional shaft 3 and on the shafts 13 and 14 are secured clutch members 19 having projections thereon adapted to be received in notches formed in driven members $a^2$ and $b^2$. These driven members are formed as pin wheels, the wheel $a^2$ having one pin and the wheel $b^2$ having two pins for a purpose which will hereinafter appear.

Each pin wheel is freely mounted on its constantly rotating shaft and is adapted to be axially moved, by means of a lever 20, (see Figs. 2, 3 and 7) into clutching engagement with the adjacent clutch member 19. The lever 20, pivoted intermediate its ends on a suitable bracket secured to the adjacent support 17 or 18, is provided with an anti-friction roller adapted to engage the side of the pin wheel. A spring 24 connected with the lever 20 and a suitable stationary part is adapted to rock the lever to axially move the pin wheel into clutching engagement with its clutch member. The spring is normally maintained out of action by means of a spring pressed trigger 21 adapted to engage the end of the lever remote from the anti-friction roller. The trigger is adapted to be operated by energizing an electro-magnet 22 as hereinafter described.

To automatically reset the triggers I provide each pin wheel with a wedge 23 over which the anti-friction roller on the lever 20 is adapted to ride. The lever is thus rocked, against the tension of its spring 24, to permit it to be engaged by the trigger. Springs 25, engaging the clutch members 19 and the pin wheels, tend to axially move the latter out of engagement with the clutch members. These springs are lighter than the springs 24 and therefore are overpowered by the latter when the triggers are released.

The pin wheel $a^2$ when axially moved on its shaft 13 to engage its clutch member 19 is adapted to mesh with the twenty toothed wheel $a^1$ and rotate it one tooth forward on each revolution of the pin wheel. The pins on the wheel $b^2$, when the latter is axially moved on its shaft 14 to engage its clutch member 19, are adapted to mesh with the sixteen toothed wheel $b^1$ and rotate it two teeth forward on each revolution of the pin wheel. To prevent any back movement of the toothed wheels $a^1$ and $b^1$ I provide spring pressed plungers 126 adapted to engage the teeth thereof.

The units $c$, $d$, $e$, and $f$ are adapted to actuate the indicators 8 and 12 in the following manner. The opposite ends of the sectional shaft connected with these units are driven by gears from the constantly rotating shaft 13 and the housing of the unit $c$ is geared to the section of the shaft 3 which is connected with the left hand gear 6 of the unit $b$. As both ends of the portion of the sectional shaft connected with the units $c$, $d$, $e$ and $f$ are driven at the same speed and in the same direction, both gears 6 of the unit $c$ are normally driven at the same speed but in opposite directions. The pinions 5 tend to rotate the housings 4 of the units $d$, $e$ and $f$ to reduce the speed of the left hand gear 6 of the unit $c$ which causes the housing of the latter to be driven to drive the left hand gear 6 of the unit $b$ in a clockwise direction. As the toothed wheel $b^1$ is operated in an anti-clockwise direction, as hereinbefore described, any movement imparted to the left hand gear 6 thereof would be added to any movement imparted by the toothed wheel $b^1$ to the right hand gear 6 and thus a correct indication would be given by the indicators, assuming the housings $d$, $e$ and $f$ were allowed to rotate a predetermined distance which varied relative to the movement of the wheel $b^1$ in proportion to the wagers registered as hereinafter described. The housings 4 of the units $c$, $d$, $e$ and $f$ are provided with toothed wheels or gears $c^1$, $d^1$, $e^1$ and $f^1$ (see Figs. 2, 4, 5 and 6), the gear $c^1$ being meshed with a pinion $c^2$ which is connected with a pinion $c^3$ meshing with a gear $c^4$ secured to the section $3^a$ of the sectional shaft 3. The gears $d^1$ and $f^1$ are constantly in mesh with driven members formed as gears $d^2$ and $f^2$ respectively which are freely mounted on the constantly rotating shaft 13. The gear $e^1$ is constantly meshed with an idler $e^3$ which is in constant mesh with a driven member $e^2$ formed as a gear which is freely mounted on the constantly rotating shaft 13. The latter is provided with a plurality of the hereinbefore described clutch members 19 having projections thereon adapted to be received in notches formed in the driven members or gears $d^2$, $e^2$ and $f^2$. These driven members are adapted to be axially moved by levers $20^a$ into clutching engagement with their clutch members 19. Springs 24, triggers 21 and electromagnets 22 are provided for operating the levers $20^a$ in the same manner as the levers 20 hereinbefore described. Springs 25 are also provided between the clutch members 19 and the gears $d^2$, $e^2$ and $f^2$ for throwing the latter out of engagement with their clutch members when the wedges 23 on the sides of the said gears rock the levers $20^a$ to reset the triggers 21.

The levers $20^a$ are secured to spindles 26 which are journalled in brackets 27 secured to the supports 1 and 17 (see Figs. 2, 4 and 12). The spindles serve as fulcrums for the levers and are provided with projections 28 adapted to normally engage shoulders $d^4$, $e^4$ and $f^4$ on the gears $d^1$, $e^1$ and $f^1$ respectively. These shoulders are formed as arcuate notches in the sides of the gears. When the trigger 21 engages the lever $20^a$, of any of the units $d$, $e$, or $f$, the spring 24 is held out of action and the projection 28 is engaged with a shoulder on the unit housing gear $d^1$, $e^1$ or $f^1$. On energizing an electro-magnet 22 the trigger is released to permit the spring 24 to rock the lever $20^a$ and axially move the adjacent gear $d^2$, $e^2$ or $f^2$ into clutching engagement, with its clutch member 19. This movement also rocks the spindle 26 and disengages the projection 28 from a shoulder on the corresponding gear $d^1$, $e^1$ or $f^1$ whereby a driving connection is established between the unit housing gear and the constantly rotating shaft gear. When a wedge 23 engages the lever $20^a$ the latter is rocked to permit the spring actuated trigger 21 to be reset which holds the spring 24 out of action and permits the spring 25 to axially move the gear $d^2$, $e^2$ or $f^2$ out of engagement with its clutch member 19. The movement of the lever caused by the wedge also moves the projection 28 to again engage a shoulder on the unit housing gear to stop it rotating. It will be noted that the gear $e^1$ in Fig. 4 has two shoulders $e^4$ and the gear $e^2$ has two wedges 23 whereby the driving connection between these gears is only established for one half revolution of the gear $e^2$ on each release of the trigger controlling the operation of this unit. The gear $d^1$ in Fig 6 has four shoulders $d^4$ and the gear $d^2$ has four wedges 23 (not shown) therefore the driving connection between these gears would be for one-quarter of a revolution of the gear $d^2$ each time the trigger for controlling the operation of this unit was operated. The gears $e^1$ and $e^2$, $d^1$ and $d^2$ have equal gear ratios (one to one) so that the gears $e^1$ and $d^1$ rotate for one half revolution and one quarter revolution respectively. The gears $f^2$ and $f^1$ have a five to four gear ratio, the former gear has one wedge 23 (not shown) so that it revolves one revolution on each release of the trigger controlling the operation of the unit $f$ but the gear $f^1$ revolves one and one-quarter revolutions. This necessitates the gear $f^1$ having four shoulders $f^4$, any one of which is adapted to be engaged by a projection 28.

The section of the sectional shaft 3 that is connected with the left hand gear 6 of the unit $f$ is driven by gearing 29 from the constantly rotating shaft 13, see Fig. 2. The section $3^b$ connected with the right hand gear 6 of the unit $c$ is also driven by gearing 30 from the constantly rotating shaft 13. The gearings 29 and 30 rotate their sections of the shaft 3 in the same direction and at the same speed which causes the sections of the shaft intermediate the driven sections to be constantly rotated. The shaft 13 is constantly rotated in an anti-clockwise direction which rotates the section of the shaft connected with the left hand differential gear 6 of the unit $f$, and thus this gear 6, in a clockwise direction. The right hand gear 6 of the unit $f$ and the left hand gear of the unit $e$ are thus rotated, by the pinions 5 of the unit $f$, in an anti-clockwise direction. The pinions 5 of the unit $e$ drive the right hand gear 6 thereof and the left hand gear 6 of the unit $d$ in a clockwise direction. The right hand gear 6 of the unit $d$ and the left hand gear 6 of the unit $c$ are driven, by means of the pinions 5 of the former unit, in an anti-clockwise direction. The pinions 5 of the unit $c$ drive the right hand gear 6 thereof and the section $3^b$ in a clockwise direction which agrees with the direction of rotation imparted by the gearing 30 to the section $3^b$. The pinions 5 of the units $d$, $e$ and $f$ tend to travel round with the left hand gears 6 of these units and thus rotate the housings 4 and the gears $d^1$, $e^1$ and $f^1$. The latter are normally held from rotation by the projections 28 so that the right and left hand gears 6 of the unit $c$ rotate at the same speed but in opposite directions so that the housing 4 of the unit $c$ and thus the gear $c^1$ are normally at rest. If one or all the gears $d^1$, $e^1$ and $f^1$ were permitted to rotate, the speed of the left hand gear 6 of the unit $c$ would be correspondingly decreased relative to the constant speed of the right hand gear 6 of the unit which would cause the pinions 5 of this unit to revolve round with the faster moving gear and thus drive the gear $c^1$ to actuate the section $3^a$ which is adapted to actuate the indicators 8 and 12 as hereinbefore described.

As hereinbefore described the toothed wheel $b^1$ is moved one eighth of a revolution to operate the indicators 8 and 12 one-quarter of a revolution to indicate a $5.00 wager. The four wedges 23 and four shoulders $d^4$ on the gears $d^2$ and $d^1$ respectively only permit the latter to rotate one-quarter of a revolution, on each release of its trigger, which decreases the rotation of the left hand gear 6 of the unit $c$ by one half revolution. This decrease causes the gears $c^1$, $c^2$, $c^3$ and $c^4$ to be driven to actuate the section $3^a$ and thus the indicators a one half revolution. The unit $d$ is thus adapted to register a $10.00 wager.

The gear $e^1$, when its controlling trigger 21 is released, rotates in the opposite direction to the gear $d^1$ and is therefore meshed with an idler $c^3$ which is meshed with the gear $e^2$. The two wedges 23 and two shoulders on the gears $e^2$ and $e^1$ respectively permit the latter to rotate a one half revolution which decreases the rotation of the right hand gear 6 of the unit $e$, both gears 6 of the unit $a$ and the left hand gear 6 of the unit $c$ by one revolution. This decrease causes the gears $c^1$ to $c^4$ to drive the section $3^a$ a full revolution and thus register a $20.00 wager.

The gear $f^1$ tends to rotate in the same direction as the gear $d^1$. The wedge 23 and four shoulders $f^4$ on the gears $f^2$ and $f^1$, respectively, permit the gear $f^2$ to rotate one revolution to a revolution and one-quarter of the gear $f^1$ which decreases the rotation of the right hand gear 6 of the unit $f$, the differential gearing of the units $e$ and $d$ and the left hand gear 6 of the unit $c$ by two revolutions and a half. This difference in speed between the two gears 6 of the unit $c$ causes the section $3^a$ and thus the indicators 8 and 12 to be rotated two and one half revolutions. The unit $f$ therefore registers a $50.00 wager.

It is obvious that any number of the units $a$ and $b$ or $d$, $e$ and $f$ may be added or omitted in multiples of two so that the direction of rotation may be kept constant. This could be done by adding, say, five more $a$ units and one $b$ unit or by omitting the $e$ unit and adding two $d$ units and one $f$ unit and by making the necessary changes in the direction of rotation of the added units.

Each indicator is preferably formed of a plurality of dials and fingers 8 and 12 (see Figs. 9 and 10), the latter being geared together so that a complete revolution of the digits indicating finger will actuate the tens indicating finger one-tenth of a revolution and so on. The three sets of shafts 3, for 1st, 2nd and 3rd positions, with their operating mechanism and their totalizing shafts 9 are mounted in a casing (see Fig. 9). The faces of the dials are numbered from zero to nine on the front of the casing and the indicating fingers are carried outside the casing.

Each ticket selling booth 31 (see Fig. 1) is provided with ten ticket issuing devices including levers 32 adapted to be operated by the ticket seller to feed a certain priced ticket, on any horse for a certain position, to the purchaser. These devices are well known in the art and therefore the levers are only diagrammatically shown. As each lever is pushed forward it is adapted to operate a switch 33 to make and break a circuit in which one of the hereinbefore described electro-magnets 22 is connected. As there are only four "horse" or sectional shafts 3, each having five units a, b, d, e and f, for registering wagers, shown in Fig. 1 only four of the switches are used and only five booths are shown, each adapted to sell a different priced ticket but all selling tickets on any horse for the same position (1st, 2nd, or 3rd).

As hereinbefore mentioned the a unit is adapted to register $2.00 wagers therefore the switches of the right hand booth 31 are connected to the electro-magnets for controlling the operation of the a units of each shaft 3, the left hand switch being adapted to control the operation of the a unit in the upper shaft 3 or #1 "horse" shaft. The second switch is adapted to control the operation of the a unit in the second shaft or #2 "horse" shaft and so on. The b units register $5.00 wagers and the switches of the $5.00 booth are connected seriatim to these units in the shafts 3. The switches of the booths for selling $10.00, $20.00 and $50.00 tickets are connected to the electro-magnets for controlling the operation of the d, e, and f units, respectively, in each shaft 3.

The mode of operation is as follows. When a ticket is fed forward to the purchaser an electro-magnet 22 is energized and assuming the purchaser bought a $2.00 ticket for 1st position or "straight" on #4 horse the electro-magnet for controlling the operation of the unit a in the sectional shaft 3 at the bottom of Fig. 1 would be energized. This disengages the trigger 21, for this unit, from its lever 20 to permit the spring 24 to rock the lever and axially move the pin wheel $a^2$ into clutching engagement with its clutch member 19. The pin wheel is thus rotated to mesh with the toothed wheel $a^1$ and rotate it one tooth in a clockwise direction. This rotates the housing 4 to cause the right hand gear 6 of the differential gearing to be rotated in a clockwise direction, as hereinbefore described, to rotate the digit indicating finger 8 one-tenth of a revolution. Assuming it was at zero it would be rotated to the numeral 1 on the dial. The totalizing shaft 9 would also be simultaneously driven by means of the helical gearing 7, 10 which rotates the housing $4^a$, of the unit A shown at the bottom of Fig. 1, to drive the upper gear $6^a$ thereof and thus the indicator 12.

The switch 33 is adapted to open the circuit to de-energize the electro-magnet immediately after it has been energized. This permits the spring pressed trigger to be positioned for engaging the lever when it is rocked by the wedge 23 on the pin wheel. This engagement takes place as the pin wheel nears the end of its revolution and causes the spring 24 to be thrown out of action which enables the spring 25 to axially move the pin wheel out of engagement with its clutching member.

If another ticket is being issued on the same horse at another booth and at the same time as the above ticket is being sold, the left hand gear 6 of the unit a will be revolved to increase the movements of the right hand gear 6 and thus the helical gear 7 and the indicators 8 and 12. For this reason it is obvious that should two "horse" shafts 3 be operating simultaneously the movement of each will cause a housing $4^b$ on the totalizing shaft 9 to be actuated and thus their total movements will be indicated on the indicator 12.

What I claim is:

1. In apparatus of the class described, the combination of a differential gear unit adapted to actuate an indicator; a constantly rotating shaft; a clutch member secured to the said shaft; means including a driven member adapted to form a drive connection between the said shaft and the unit, the driven member being mounted on the shaft and adapted to be axially moved into and out of engagement with the said clutch member; manually controlled means for axially moving the driven member into clutching engagement with the clutch member; and means independent of the manually controlled means for automatically moving the driven member axially of the shaft and out of engagement with the clutch member when the driven member has rotated the unit a predetermined distance.

2. In apparatus of the class described, the combination of a differential gear unit provided with a toothed wheel and adapted to actuate an indicator; a constantly rotating shaft; a clutch member secured to the said shaft; a pin wheel freely mounted on the shaft and adapted to be axially moved into and out of engagement with the said member; manually controlled means for axially moving the pin wheel into clutching engagement with the member, the pin wheel being adapted to drive the toothed wheel; and means, independent of the manually controlled means, for automatically moving the pin wheel axially of the shaft and out of engagement with the clutch member when the pin wheel has rotated the toothed wheel a predetermined distance.

3. In apparatus of the class described, the combination of a unit adapted to actuate an indicator; a constantly rotating shaft; a clutch member secured to the said shaft; means including a driven member adapted to form a drive connection between the said shaft and the unit, the driven member being freely mounted on the shaft and adapted to be axially moved into and out of engagement with the said clutch member; a lever engaging the side of the driven member; a spring tending to rock the lever to move the driven member into clutching engagement with the said clutch member; a trigger adapted to engage the lever for normally maintaining the spring out of action; manually controlled means for operating the trigger; a wedge carried on the face of the driven member adapted to move the lever to permit the trigger to be reset; and a second spring, lighter than the first mentioned spring, tending to axially move the driven member out of engagement with the clutch member.

4. In a totalizer, the combination of a plurality of independent sectional shafts arranged in parallel, each shaft having a single indicator adapted to immediately indicate the movements of each section; a plurality of units including differential gears connecting the various sections of each shaft; means for controlling any one or more of the units of each shaft to immediately effect the rotation of its indicator whereby the total movements of all the sections of each shaft will be indicated on a common indicator; a sectional totalizing shaft; an indicator operated by the totalizing shaft; a plurality of units including differential gears connecting the various sections of the totalizing shaft; gears on the first mentioned shafts adjacent the indicators thereof; and a gear on each of the units of the totalizing shaft meshed with one of the first mentioned gears, the gearing being arranged to drive the adjacent units on the totalizing shaft in opposite directions whereby the total movements of all the first mentioned sectional shafts will be indicated by the totalizing shaft indicator.

5. In a totalizer, the combination of a sectional shaft, the end section being adapted to actuate an indicator; a unit including a housing, differential gears and a pinion, the gears being carried on the ends of adjacent shaft sections, the pinion being carried on the housing; a toothed wheel carried by the housing; a constantly rotating shaft; a clutch member secured to the shaft; a member freely mounted on the constantly rotating shaft and adapted to be moved into clutching engagement with the clutch member to positively control the toothed wheel to cause the rotation of the indicator, manually controlled means for axially moving the controlling member into engagement with the clutch member; and automatic means for axially moving the controlling member out of engagement with the clutch member.

6. In a totalizer, the combination of a plurality of independent sectional shafts arranged in parallel, each shaft having a single indicator adapted to indicate immediately the movements of each section; a plurality of units including differential gears connecting the various sections of each shaft; means for controlling any one or more of the units of each shaft to immediately effect the rotation of its indicator whereby the total movements of all the sections of each shaft will be indicated on a common indicator; a sectional totalizing shaft having its axis substantially at right angles to the axes of the first mentioned sectional shafts; an indicator operated by the totalizing shaft; a plurality of units including differential gears connecting the various sections of the totalizing shaft; helical gears on the first mentioned shafts; and a helical gear on each of the totalizing shaft units meshed with one of the first mentioned gears, the teeth of adjacent sets of meshed gears being cut in the opposite direction to drive the adjacent units in alternate direction whereby the total movements of all the first mentioned sectional shafts will be indicated by the totalizing shaft indicator.

7. In a totalizer, the combination of a sectional shaft; a constantly rotating shaft; means for constantly driving two sections of the sectional shaft at the same speed from the constantly rotating shaft; two units for connecting the sections of the shaft between the driven sections, each unit including differential gears, a pinion and a housing for carrying the pinion; means for releasably locking one of the said housings to prevent it rotating; manually controlled means adapted to release the locking means and to permit the housing to rotate a predetermined distance thus varying the relative speeds of the differential gears of the other unit; and an indicator adapted to be actuated by the housing of the last mentioned unit.

8. In a totalizer, the combination of a sectional shaft; a constantly rotating shaft; means for constantly driving two sections of the sectional shaft at the same speed from the constantly rotating shaft; two units for connecting the sections of the shaft between the driven sections, each unit including differential gears and a housing; means for releasably locking one of the said housings; means including a clutch adapted to form a drive connection between the constantly rotating shaft and the lockable housing; manually controlled means for releasing the locking means and throwing the clutch into operation; means for automatically throwing the clutch out of operation and the locking means into operation when the released housing has rotated a predetermined distance; and an indicator adapted to be actuated by the other housing.

9. In a totalizer, the combination of a sectional shaft; a constantly rotating shaft; means for constantly driving two sections of the sectional shaft at the same speed from the constantly rotating shaft; two units for connecting the sections of the shaft between the driven sections, each unit including differential gears, a pinion and a housing for carrying the pinion; means for releasably locking one of the said housings; a gear secured to the lockable housing; a gear freely mounted on the constantly rotating shaft and meshed with the first mentioned gear; manually controlled means adapted to release the locking means and to form a drive connection between the second mentioned gear and the constantly rotating shaft whereby the relative speeds of the differential gears of the other unit will be varied; and means for automatically disengaging the said drive connecting means and for moving the locking means into operation when the first mentioned gear has rotated a predetermined distance; and an indicator adapted to be actuated by the housing of the last mentioned unit.

10. In a totalizer, the combination of a sectional shaft; a constantly rotating shaft; means for driving two sections of the sectional shaft from the constantly rotating shaft; two units including differential gears for connecting the sections of the shaft between the driven sections; a clutch member secured to the constantly rotating shaft; a gear secured to one of the units and provided with a shoulder; a gear on the constantly rotating shaft and meshed with the first mentioned gear, the gear being freely mounted on the said shaft and adapted to be axially moved into and out of engagement with the said clutch member; a lever engaging the side of the second mentioned gear; a spindle secured to the lever and forming the fulcrum thereof, a projection carried by the spindle and adapted to be moved into and out of engagement with the said shoulder; a spring tending to rock the lever to move the second gear into clutch engagement with the clutch member and to move the projection out of engagement with the shoulder; a trigger adapted to engage the lever for normally maintaining the spring out of action; manually controlled means for operating the trigger; a wedge carried on the face of the second mentioned gear adapted to move the lever to permit the trigger to be reset; and a second spring, lighter than the first mentioned spring, tending to axially move the second mentioned gear out of engagement with the clutch member.

11. In a totalizer, the combination of a sectional shaft; a constantly rotating shaft; means for constantly driving two sections of the sectional shaft from the constantly rotating shaft; two units for connecting the sections of the shaft between the driven sections, each unit including differential gears and a housing; means for releasably locking one of the said housings; manually controlled means adapted to release the locking means and to permit the housing to rotate a predetermined distance; gearing for connecting the other housing with the section of the shaft adjacent to the constantly driven sections; a third unit including differential gearing for connecting adjacent sections of the shaft normally unconnected with the constantly driven shaft, the third unit being provided with a toothed wheel and adapted to actuate an indicator; means including a clutch and an axially movable pin wheel adapted to form a drive connection between the constantly rotating shaft and the toothed wheel; manually controlled means for moving the pin wheel into clutching engagement with the clutch; and automatic means for axially moving the pin wheel out of engagement with the clutch when the toothed wheel has been rotated a predetermined distance.

12. In apparatus of the class described, the combination of a unit adapted to actuate an indicator; a constantly rotating shaft; a clutch member secured to the said shaft; means including a driven member adapted to form a drive connection between the said shaft and the unit, the driven member being freely mounted on the shaft and adapted to be axially moved into and out of engagement with the said clutch member; a lever engaging the side of the driven member; a spring tending to rock the lever to move the driven member into clutching engagement with the said clutch member; a trigger adapted to engage the lever for normally maintaining the spring out of action; manually controlled means for operating the trigger; and means operable by the driven member for moving the lever to permit the trigger to be reset after the driven member has rotated a predetermined distance.

13. In a totalizer the combination of a plurality of sectional shafts arranged in series; an indicator for each shaft adapted to be positively operated thereby; a plurality of units connecting the various sections of each shaft, each unit including differential gears, a pinion and a housing for carrying the pinion; a constantly rotating shaft for each sectional shaft; means including a plurality of fixed and movable clutch members on the constantly rotating shafts for controlling the housings; means for controlling any one or more of the movable clutch members to control the rotation of the corresponding housing; a sectional totalizing shaft; an indicator positively and simultaneously operated by the totalizing shaft; and means for forming a positive drive connection between each of the first mentioned shafts and a section of the totalizing shaft, each indicator for the first mentioned shafts being adapted to simultaneously register the total rotary movement of a shaft independently of the others and the totalizing shaft indicator being adapted to simultaneously register the total rotary movements of all the first mentioned shafts.

14. In apparatus of the class described the combination of a unit adapted to actuate an indicator; a constantly rotating shaft; means adapted to form a drive connection between the shaft and the unit; means including a spring normally tending to actuate the drive connecting means to drive the unit; means for releasably locking the actuating means in the inoperative position; manually controlled means for releasing the locking means; and spring means independent of the manually controlled means, constantly tending to maintain the drive connecting means out of operation, the spring means being weaker than the first mentioned springs.

15. In apparatus of the class described, the combination of a unit adapted to actuate an indicator; a constantly rotating shaft; a clutch member secured to the said shaft; means including a driven member adapted to form a drive connection between the said shaft and the unit, the driven member being freely mounted on the shaft and adapted to be axially moved into and out of engagement with the said clutch member; means normally tending to axially move the driven member into clutching engagement with the clutch member; manually controlled means for normally preventing the said movement of the driven member; and means independent of the manually controlled means constantly tending to axially move the driven member out of engagement with the clutch member.

16. In apparatus of the class described, the combination of a unit adapted to actuate an indicator; a constantly rotating shaft; means including a clutch carried on the shaft and adapted to form a drive connection between the said shaft and the unit; means normally tending to throw the clutch into operation; means for releasably locking the clutch operating means in the inoperative position; manually controlled means for releasing the locking means; and means independent of the manually controlled means, constantly tending to throw the clutch out of operation.

Signed at Toronto, Canada, this 22nd day of July, 1925.

HARRY C. PASS.